Patented Dec. 22, 1936

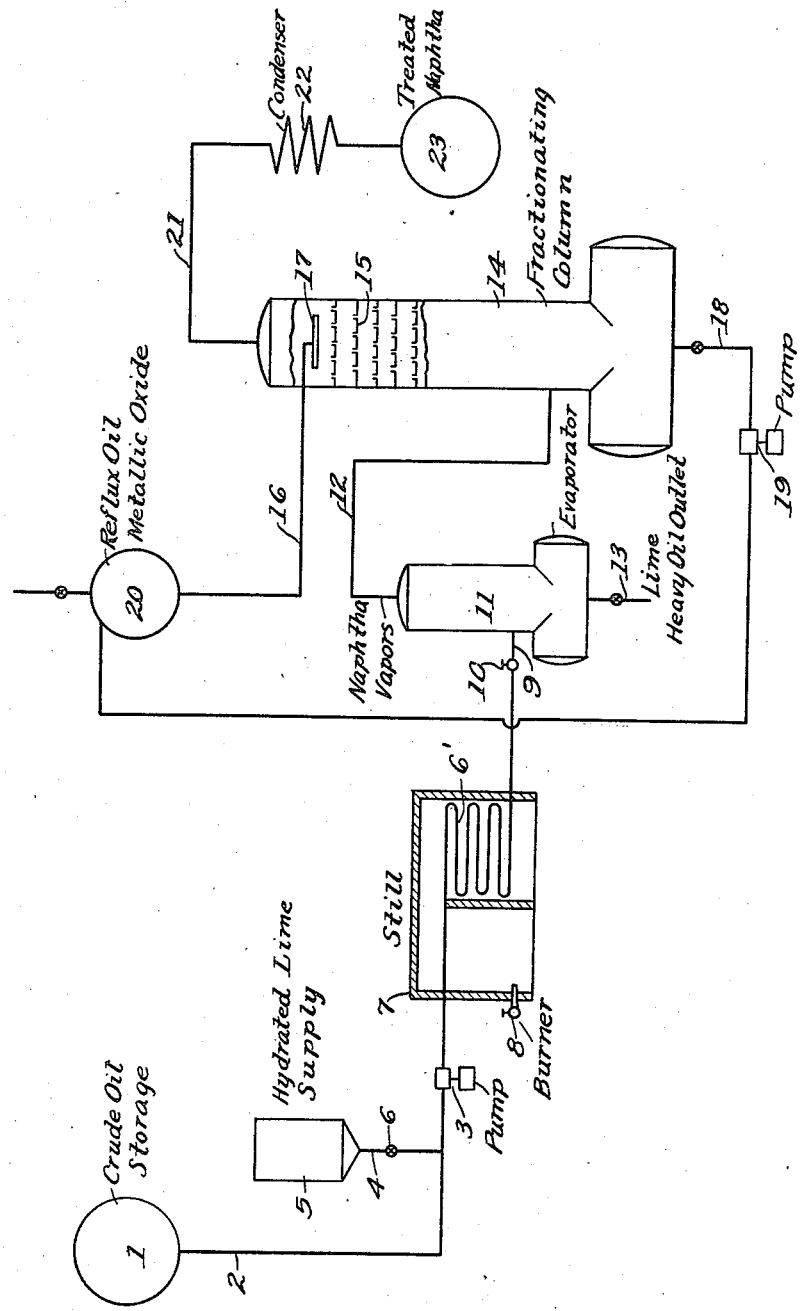

2,064,999

UNITED STATES PATENT OFFICE 2,064,999

PROCESS FOR DESULPHURIZING AND TREATING NAPHTHAS

Cornelius B. Watson, Chicago, Ill., assignor to The Pure Oil Company, Chicago, Ill., a corporation of Ohio Application May 25, 1932, Serial No. 613,485

4 Claims. (Cl. 196—26)

This invention relates to an improved process for desulphurizing and otherwise treating low boiling hydrocarbon oils, such as gasoline and naphtha.

An object of the invention resides in a process wherein crude oil is distilled to remove as vapors its lower boiling fractions, and wherein the distillation takes place in the presence of hydrated lime so that the hydrogen sulphide present in the crude oil is permitted to combine with the lime, leaving only the mercaptans in the vapors of the low boiling fractions for additional treatment.

Another object is to further treat the low boiling compounds, from which hydrogen sulphur has been removed with a metallic oxide, copper oxide having been found particularly suitable, to remove the mercaptans and finally treat the vapors, thus avoiding the necessity of treating hydrogen sulphide with copper oxide and overcoming the objections incident to such treatment.

In the accompanying drawing, there has been disclosed apparatus, diagrammatically illustrated, which may be used in carrying out one of the specific embodiments of the invention.

In the drawing, the numeral 1 indicates a storage or working tank adapted for the reception of crude oil, and leading from the tank is a pipe line 2 in which is arranged a pump 3. Connected with the inlet side of the pump is a conduit 4 leading from a magazine 5 containing hydrated lime. The line 4 may be provided with a regulating valve 6 by which the amount of lime fed to the oil passing through the pump is subject to variation or control.

The mixture of hydrated lime and crude oil is then advanced through a heating coil 6 of a tube still 7, the latter being heated by, for example, one or more burners 8. The oil in passing through the coil 6 is heated to a temperature sufficiently high to vaporize the lower boiling fractions of the oil, especially the gasoline or naphtha fractions thereof. If desired, the oil while being heated to vaporizing temperatures may be maintained under superatmospheric pressures and for this reason the discharge line 9, leading from the still, is formed with a pressure reducing valve 10. In this operation, the hydrated lime apparently combines with hydrogen sulphide present in the crude oil, leaving only mercaptans to be acted upon in a correlated treating operation.

The line 9, beyond the valve 10, enters an evaporator 11 from the top of which, after some fractionation, there is drawn off as vapors the light or low boiling fractions through an overhead line 12. The remaining heavier fractions of the crude oil together with the lime and other impurities may be constantly removed from the bottom of the evaporator through a valve discharge line 13.

The line 12 enters the lower portion of a fractionation tower 14, through which the low boiling oil vapors then pass upwardly, and are in their passage brought into intimate contact with a descending reflux oil, or a heavier oil having mixed therewith a treating material in the form of a metallic oxide, especially copper oxide. This reflux oil or heavier treating oil holds the oxides in solution and suspension, and said liquid, with the oxides, flowing in a downward direction over the baffle plates or trays 15 and falling from one to the other through the rising vapors. A constant stream of the reflux oil having the oxides dissolved and suspended therein may be introduced at the top of the fractionation tower through the line 16 and spray coil 17 and following passage through the fractionation tower may be removed from the latter by way of an outlet line 18 connected with the bottom of the tower. The liquid drawn off is returned to the tower and the whole or a portion of the precipitated or solid matter in suspension being removed and replaced by fresh oxides at each cycle of operation or from time to time. Thus, the line 18 may be provided with a pump 19 for returning the oxide solution to a working tank 20 with which the line 16 is connected. In lieu of copper oxide, it is within the range of the invention to employ other treating materials, for example, the oxides of lead, tin, zinc, cadmium, nickel, cobalt, iron and mixtures of two or more of these oxides.

The oxide containing solution serves to remove the mercaptans and the treated vapors pass from the top of the fractionation tower by way of a line 21, thence through a condenser 22 to a storage tank 23.

The present invention thus provides for the desulphurizing and treating of naphthas in a continuous process wherein hydrogen sulphide is first removed by treatment with hydrated lime and wherein the mercaptans present in the vapors may be reacted upon in a separate treating tower with the use of a metallic oxide, the process being extremely effective and efficient since the hydrogen sulphide does not have to be removed or acted upon by copper oxide.

What is claimed is:

1. The method of simultaneously desulphurizing and fractionating petroleum oils containing hydrogen sulphide and mercaptans which consists in mixing lime with said oil, heating the mixture in a restricted stream to a temperature above vaporizing temperature of the light fractions present in said oil, maintaining the lime in contact with the oil for a period of time sufficient to react with substantially all the hydrogen sulphide present in said oil, vaporizing the light fractions of said oil and subjecting the vapors to fractionation, contacting the vapors in the fractionating zone with a counter-current stream of metallic oxide suspended in heavy reflux oil, said oxide being capable of removing mercaptans present in said vapors, removing purified vapors from the top of said fractionating zone and condensing them, recirculating suspended oxide from the bottom to the top of said fractionating zone, and separately withdrawing unvaporized residue, admixed with spent lime, from the system.

2. Method according to claim 1 in which the metallic oxide is selected from the group consisting of lead, cadmium and copper oxides.

3. Method according to claim 1 in which the metallic oxide contains copper oxide.

4. The method of simultaneously desulphurizing and fractionating crude petroleum oils containing hydrogen sulphide and mercaptans which consists in mixing lime with said oil, heating the mixture in a restricted stream to a temperature sufficient to vaporize the naphtha contained in said oil, maintaining the lime in contact with the oil for a period of time sufficient to react with substantially all the hydrogen sulphide present in said oil, vaporizing the naphtha and subjecting the vapors to fractionation, contacting the vapors in the fractionating zone with a counter-current stream of copper oxide suspended in heavy reflux oil, removing purified vapors from the top of said fractionating zone and condensing them, recirculating suspended oxide from the bottom to the top of said fractionating zone, and separately withdrawing unvaporized residue, admixed with spent lime, from the system.

CORNELIUS B. WATSON.